United States Patent [19]
Sheffo et al.

[11] 3,754,820
[45] Aug. 28, 1973

[54] COPIER-DUPLICATOR MACHINE

[75] Inventors: Loren Sheffo, Platine; Henry A. Mathisen, Northbrook, both of Ill.

[73] Assignee: Addressograph-Multigraph Corporation, Mount Prospect, Ill.

[22] Filed: Apr. 16, 1971

[21] Appl. No.: 134,846

Related U.S. Application Data

[62] Division of Ser. No. 735,402, June 7, 1968, Pat. No. 3,612,682.

[52] U.S. Cl. .................................................. 355/3
[51] Int. Cl. ............................................ G03g 15/00
[58] Field of Search ............................ 355/3, 17, 55

[56] References Cited
UNITED STATES PATENTS

3,556,655  1/1971  Lux ..................................... 355/55
3,671,121  6/1972  Albert ................................. 355/17

Primary Examiner—John M. Horan
Attorney—Sol L. Goldstein

[57] ABSTRACT

A copier-duplicator includes a master preparing section for uniformly charging and then exposing a photo-electrostatic master to provide a latent image on the master. An adjustable optical system permits the size of the image to be changed to provide copies of different sizes, and a controlled illumination source removes the charge from the unused area of the master to avoid spurious powder transfer to the copies. The prepared master is clamped on a rotating cylinder, and the image is developed by powder and transferred to copy sheets by a pressure roller as many times as required to produce the desired number of copies.

10 Claims, 12 Drawing Figures

Patented Aug. 28, 1973

Inventors:
Loren E. Sheliffo
Henry A. Mathisen
Sol L. Goldstein
Attys.

COPIER-DUPLICATOR MACHINE

This application is a division of copending application Ser. No. 735,402, filed June 7, 1968, now U.S. Pat. No. 3,612,682, Loren E. Shelffo and Henry A. Mathisen, and assigned to the same assignee as the instant application.

This invention relates to a copier-duplicator apparatus and, more particularly, to a new and improved apparatus for making one or more copies of an original using a photoelectrostatic member.

Most electrostatic copying or duplicating machines now available are of two general types in which the material image is either directly formed on a photoconductive copy sheet or is formed on a photoconductive member forming a part of the machine and then transferred to a copy sheet. Certain advantages are provided by a copying system in which the photoconductive member is a disposable item, such as a master sheet, which is used for making one or more copies and is then discarded. A system of this general type is shown, for example, in the pending application of Loren E. Shelffo, Ser. No. 632,819, filed Apr. 21, 1967, which application is assigned to the same assignee as the present application.

In this type of copying or duplicating system, an electrostatic image is formed on the master sheet in accordance with the original to be copied, and the master sheet is then developed to provide a visible or material image which is transferred to copy material, the developing and transferring steps being repeated until the desired number of copies have been produced. Since the electrostatic image is formed only once on a master sheet, it would be advantageous to be able to separate the portion of the machine operating only on the master sheet from that part involving the material image developing and the transfer of this image to the copy material. It would also be desirable to provide an apparatus in which the handling of the master sheet and the copy sheet as well as the transfer of the master sheet between the various parts of the machine and its ejection could be automatically performed while insuring the quality of the copies produced.

Accordingly, one object of the present invention is to provide a new and improved photoelectrostatic copying or duplicating machine.

Another object is to provide a photoelectrostatic copying or duplicating machine including new and improved means for forming an electrostatic image on a photoconductive member.

A further object is to provide such a machine including means for preventing the spurious deposits of developer material in undesired areas.

Another object is to provide a photoelectrostatic copying or duplicating machine including new and improved means for feeding a master sheet to and clamping a master sheet on a cylinder or drum.

Another object is to provide a machine of this type including new and improved means for detachably mounting a master sheet on a cylinder or drum.

A further object is to provide a photoelectrostatic copying or duplicating machine including a new and improved drum or cylinder for receiving a photoconductive member.

Another object is to provide a photoelectrostatic copying or duplicating machine including new and improved means for controlling and synchronizing the formation of an electrostatic image on a master sheet, the transfer of the master sheet to a rotatable drum or cylinder, the repeated development of material images on the master sheet, and the transfer of these images to copy material.

In accordance with these and many other objects, an embodiment of the invention comprises a copier-duplicator of the photoelectrostatic type in which a photoconductive master sheet is uniformly charged and then illuminated in accordance with an original to be copied to produce an electrostatic image on the master. Adjustable optical means permit full size or reduced size electrostatic images to be formed. In view of the fact that the electrostatic image occupies different areas on the master sheet, and so as to prevent the spurious deposition of developer material during subsequent steps in the copying operation, the sub-unit of the machine in which the electrostatic image is formed includes means for removing the uniform charge from the marginal areas of the sheet, as by selective illumination in dependence on the area of the master sheet occupied by the useful image.

To permit one or more copies to be produced on untreated copy material such as sheets of paper and at high speeds, the apparatus includes a printing drum or cylinder to which the leading edge of the master sheet is clamped. The control circuit for the machine is such that when the master sheet is clamped to the cylinder, the sub-system for forming the electrostatic image on the master sheet is disabled. When the master sheet is clamped on the cylinder, the cylinder initiates one or a series of cycles of revolution during which the electrostatic image on the sheet is developed, as by a magnetic brush developer, and a visible or material image is thus formed and transferred to copy material such as sheets of paper which are fed between the cylinder and a transfer roll in synchronism with the movement of the material image past the transfer roll. The material image transferred to the copy material is placed in permanent form, and the copy sheet is ejected while continuing rotation of the cylinder produces subsequent copies. The cylinder or drum is formed with a flattened surface in the area in which the trailing edge of the master sheet will be located so that any toner or developer material deposited on the trailing edge of the sheet will not be transferred to and contaminate the transfer roll. When the desired number of copies has been produced, the clamping device on the drum or cylinder is released, and stripper blades remove the master from the drum during its last cycle of rotation as the drum returns to its normal position in which it is disposed to receive the next master sheet. During this last cycle of rotation, a blank sheet of paper is fed to the cylinder so that it covers the surface of the master sheet as the master sheet is fed out over the same path as the copy sheets previously made. This prevents contamination of any of the rolls or guide surfaces in the copy conveying path.

Many other objects and advantages of the present invention will become apparent from considering the following detailed description in conjunction with the drawings in which.

Figure 1:
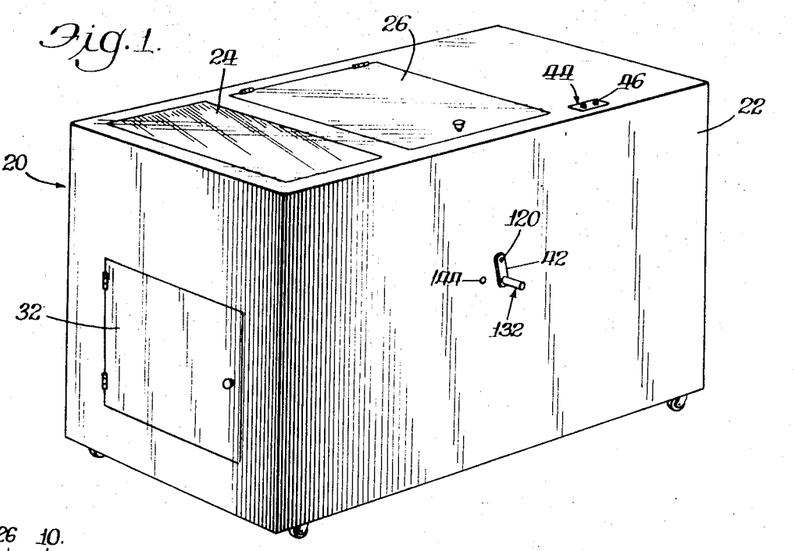
FIG. 1 is a perspective view of a copier-duplicator embodying the present invention.
Figure 2:
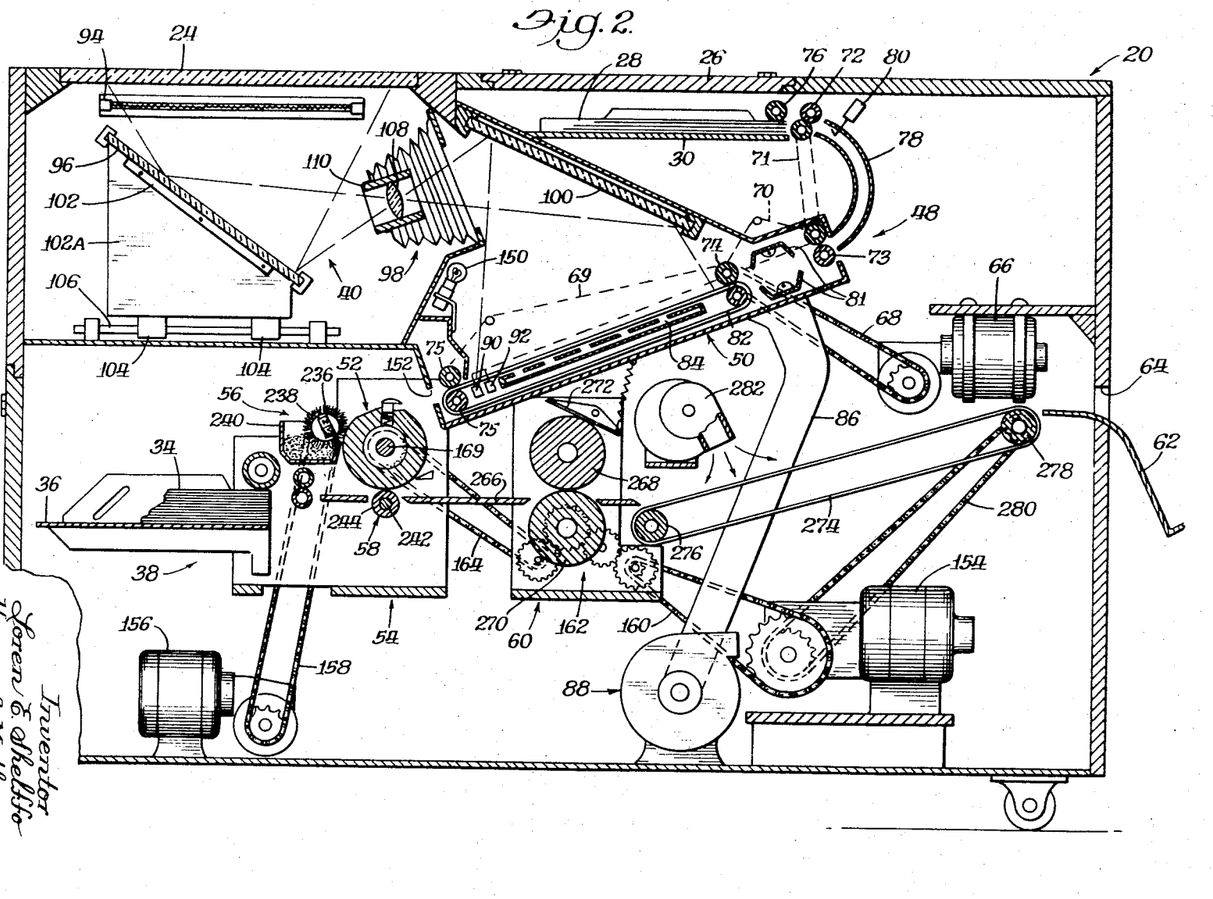
FIG. 2 is a sectional view of the apparatus shown in FIG. 1.

Referring now more specifically to FIGS. 1 and 2 of the drawings, therein is illustrated a copier-duplicating machine which is generally indicated as 20 and which embodies the present invention. The machine 20 includes a housing or casing 22 having a transparent member or glass pane 24 on which an original to be copied is disposed. To prepare the machine 20 for operation, a door 26 in the housing 22 is opened, and a supply of master sheets 28 (FIG. 2) is placed on a support 30 therefor. Further, a pivotally mounted door 32 (FIG. 1) is opened, and a supply of copy material such as untreated paper sheets is placed on a sheet supporting table 36 included in and forming part of a sheet feeding assembly indicated generally as 38. An adjustable optical assembly indicated generally as 40 (FIG. 2) including a manually adjustable lever 42 (FIGS. 1 and 4) is then adjusted by positioning the lever 42 to a desired position to provide either full size or reduced size copies of the original.

A control indicated generally as 44 (FIG. 1) is adjusted to the number of desired copies, and a start button 46 is then actuated to start operation of the machine 20. In response to a start signal, one master sheet 28, which preferably comprises a flexible paper base coated with a photoconductive layer containing zinc oxide particles dispersed in an insulating resin binder, is fed into a master preparing assembly indicated generally as 48 in which the photoconductive layer is provided with a uniform electrostatic charge. This sheet is then advanced to an exposing station indicated generally as 50 in which it is selectively discharged by the momentary illumination of the original on the plate 24 to provide an electrostatic image. Means are also provided at the station 50 for removing the charge from those areas of the master sheet 28 not occupied by the electrostatic image. The master sheet 28 containing the electrostatic image is then discharged from the assembly 48 and this assembly is then returned to an inoperative state.

More specifically, the leading edge of the master sheet 28 discharged from the assembly 48 is clamped to a drum or cylinder 52 at a copying station indicated generally as 54, and the cylinder 52 is placed in rotation. As the cylinder 52 rotates, the master sheet 28 is wrapped around the outer peripheral surface of this drum or cylinder, and the electrostatic image on the outer surface thereof is carried by a conventional magnetic brush developer indicated generally as 56 in which the electrostatic image is converted to a material or visible image comprising particles of toner or developer material which are retained on the master sheet in accordance with the electrostatic pattern thereon. Further rotation of the cylinder 52 carries the master sheet to a position adjacent a pressure roller 58 so that the master sheet is pressed against a copy sheet 34 fed between the cylinder 52 and the roller 58 by the assembly 38. This transfers the visible or material image to the copy sheet 34, and this sheet is conveyed through a fixing station indicated generally as 60 in which the material image is placed in permanent form. The copy sheet 34 is then transported through the interior of the housing 22 to be discharged therefrom onto a copy receiving rack 62 through an opening 64 in the wall of the housing 22.

During each succeeding cycle of rotation of the cylinder 52, the electrostatic image is re-developed by the assembly 56 and transferred to additional copy sheets 34 supplied by the assembly 38, the master sheet being such that several thousand transfers can be made before the electrostatic image is spent. When the desired number of copies has been made, the master 28 is stripped from the cylinder 52 and discharged from the machine 20 over the same path followed by the copy sheets 34.

Referring now more specifically to the master preparing assembly 48, when the machine 20 is placed in operation by the operation of the start button 46, a control circuit energizes a drive motor 66 which is effective through four chain belt drives 68–71 to drive four opposed sets of rollers 72–75 which are used to transport the master sheet 28 through the assembly 48. The rollers 72 are also initially coupled to a master sheet feeding roller or wheel 76 through an electrically controllable clutch so that the energization of the motor 6 causes rotation of the roller 76 to feed the top master sheet 28 from the stack carried on the support 30 so that its leading edge passes between the nip between the rollers 72 and is driven thereby into an arcuate guide channel or guideway 78. The leading edge of the master sheet 28 actuates a switch 80 on entering the guideway 78, and the operation of the switch 80 is effective to de-energize the clutch so that the wheel 76 is no longer rotated. Accordingly, the master sheet 28 now travels through the guideway 78 until the leading edge passes into the nip between the opposed rollers 73, and these rollers further convey the sheet between a pair of corona charging units 81 which apply suitable poled uniform electrostatic charges to both surfaces of the master sheet 28.

As the master sheet 28 passes beyond the corona charging units 81, it enters the nip between the opposed rollers 74, and the sheet is supported on one or a number of axially spaced, flexible conveying bands 82 which are entrained on the lowermost of the rollers in the pairs of rollers 74 and 75. A vacuum chest 84 disposed immediately adjacent the lower surface of the upper flight of the conveying bands 82 is connected through a duct 86 with the intake to a blower and motor assembly 88. The air intake into the chest 84 holds the master sheet 28 in a uniplanar position on the conveying belts 82 as it passes through the exposure station 50. As the leading edge of the master sheet 28 approaches the opposed rollers 75, two switches 90 and 92 are energized to cause the selective illumination of the photoconductive layer or surface of the master sheet 28 in accordance with the original resting on the member 24 so as to form an electrostatic image.

More specifically, the actuation of the switches 90, 92 energizes a pair of opposed light sources of xenon lamps 94 to provide a momentary and intense source of light which is reflected off the original resting on the panel 24 to be directed by an adjustable mirror 96 through an adjustable lens assembly 98 to a mirror 100 from which the light image is directed onto the charged surface of the master sheet 28 at the exposing station 50. With the master sheet 28 moving at a speed of around three inches per second, full frame exposure by flashing the xenon lights 94 does not result in blurring of the image.

The optical system 40 which generates an electrostatic image on the charged surface of the master sheet 28 corresponding to the original to be copied includes the xenon lamps 94, the adjustable mirror 96, the adjustable lens assembly 98, and the fixed mirror 100. The assembly 40 can be adjusted to two positions to provide either a full size copy of the original or a reduced size copy of the original. The components of the assembly 40 are shown in FIGS. 2 and 3 in a position providing a full size copy, and the mirror 96 and the lens assembly 98 are moved away from each other to provide a reduced size copy.

The movable mirror 96 is mounted on the bight portion of a generally U-shaped supporting bracket or frame 102 having two depending legs 102A (FIG. 2) and 102B (FIG. 3) whose lower ends are secured to four spaced sleeves 104 slidably mounted on two rods 106 carried on a partition of the housing 22.

Figures 3, 4, 8:
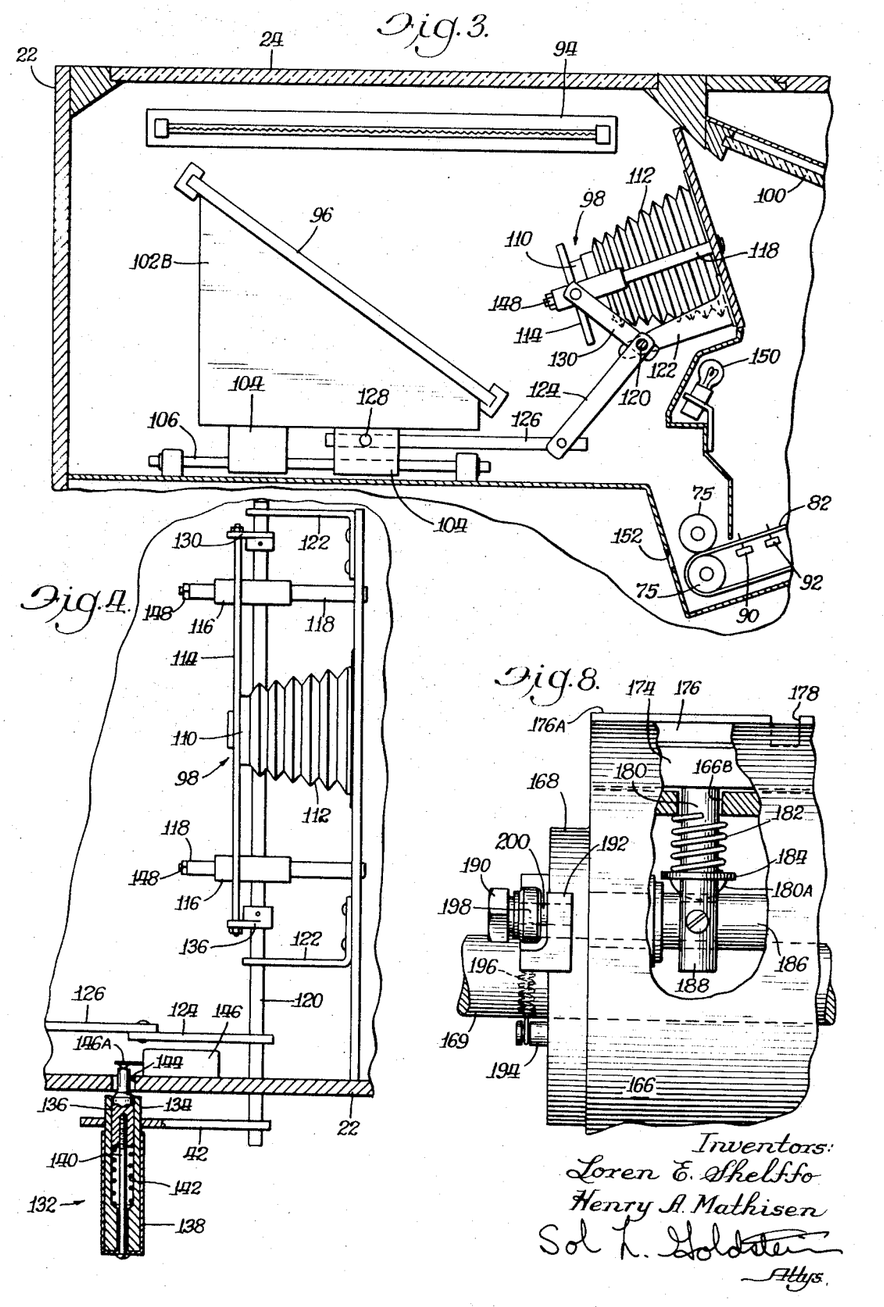
FIG. 3 is an enlarged sectional view of an adjustable optical assembly for producing copies of different sizes.
FIG. 4 is a fragmentary top elevational view in partial section of the adjustable optical assembly shown in FIG. 3.
FIG. 8 is a fragmentary side elevational view in partial section illustrating the cylinder and clamping means shown in FIGS. 5–7.

The adjustable lens assembly 98 includes a lens 108 (FIG. 2) disposed within a lens barrel 110 which is connected to a dividing partition of the housing 22 by a flexible bellows 112 (FIG. 3). An apertured plate 114 is secured to the left-hand end of the barrel 110, and opposite end portions of the plate 114 carry a pair of bushings or sleeves 116 (FIG. 4) in which are slidably received a pair of guide rods 118 secured at their other end to the partition of the housing 22.

As set forth above, adjustment of the lever 42 (FIGS. 1 and 4) adjusts the optical system 40 to its various settings. One end of the lever 42 (FIG. 4) is secured to the outer end of a shaft 120 that is rotatably mounted on the housing 22 by a pair of spaced and generally L-shaped brackets 122. To provide means for adjusting the position of the movable mirror 96, an arm 124 is rigidly secured at one end to the shaft 120 (FIG. 3) and is pivotally connected at its other end to a link 126. The other end of the link 126 is pivotally connected to one of the sleeves 104 by a pivot pin 128. To provide means for shifting the position of the lens assembly 98, two arms 130 are rigidly secured at one end to the shaft 120 and are pivotally connected at their other ends to opposite ends of the plate 114.

To provide means for shifting the lever 42 and thus the shaft 120 to its different positions, a handle assembly indicated generally as 132 (FIG. 4) is connected to the free end of the arm or lever 42. The handle assembly 132 includes a hollow cylindrical member 134 that is rigidly secured within an opening in the lever 42. A combined detent and switch operation member 136 is slidably mounted within the member 134 and is connected to a cylindrical shell 138 slidably mounted on the outer surface of the member 134 by a pin 140. A compression spring 142 is interposed between the lower surface of the member 136 and a shouldered portion of the opening within the member 134 so that the detent and switch operating member 136 is continuously biased against the adjacent surface of the housing 22.

As set forth above, when the adjustable optical assembly 40 is set for production of full size copies, the lever 42 is in the position shown in FIG. 1, and the mirror 96 and the lens assembly 98 occupy the relative positions illustrated in FIG. 3. When the assembly 40 is to be adjusted to a position for producing reduced size copies, the handle assembly 132 is moved to the left (FIG. 1) to pivot the arm or lever 42 and the connected shaft 120 in a clockwise direction. During this movement, the inner end of the member 134 (FIG. 4) slides along the outer surface of the adjacent wall of the housing 22 until it is forced by the bias of the spring 142 into a locating opening 144. When the member 136 enters the opening 144, it positively positions the assembly 40 in a predetermined position, and the inner end of the member 136 engages an operator element 146A of a switch 146 to operate this switch. The operation of the switch 146 provides an electrical control signal indicating that the machine 20 is conditioned for the production of reduced size copies.

As the shaft 120 is pivoted in a clockwise direction (FIG. 3), the arm 124 moves upwardly to force the link 126 to the left and thus slides the supporting bracket 102 for the mirror 96 to the left to move this mirror away from the lens assembly 98. The same clockwise rotation of the shaft 120 moves the upper ends of the arms 130 to the right and shifts the plate 114 and the connected lens barrel 110 to the right so that the lens assembly 98 is moved away from the mirror 96. Thus, when reduced size copies are made, a spacing between the movable mirror 96 and the lens assembly 98 is increased. The optical assembly 40 can be returned to a setting for producing full size copies merely by withdrawing the connected elements 136, 138, and 140 against the bias of the spring 142 until the outer end of the element 136 clears the opening 144. The lever 142 can then be pivoted in a counterclockwise direction (FIG. 1) to the normal position. This normal position can be determined, for instance, by engagement of the left-hand end of the sleeves 116 with nuts 148 secured to the free ends of the rods 118.

Since full and reduced size copies are to be made and corresponding different size electrostatic images are developed on the master sheet 28, there inherently will be some portion of the trailing edge of the master sheet 28 at the exposing station 50 which will not be subjected to illumination and thus will retain its uniform electrostatic charge. This charge remaining on the master sheet 28, when passing by the magnetic brush developer 56, would retain developer or toner material which frequently would be deposited either directly on the front of the copy sheet or indirectly through the transfer roller 58 on the back of the copy sheet. To avoid this discoloration of the produced copy, the assembly 48 includes a line of incandescent lamps 150 or a similar light source extending transverse to the direction of movement of the master sheet 28. The lamps 150 are selectively illuminated in dependence on the size of the copy desired to fully illuminate the area of the master sheet 28 not occupied by the electrostatic image so as to dissipate the charge thereon and thus prevent the undesired retention of toner material by this part of the master sheet.

After the electrostatic image has been formed on the master sheet 28 and as the surplus electrostatic charge thereon is removed, the master sheet 28 is discharged from the master sheet preparing assembly 48 through an outlet 152 (FIG. 2), and the assembly 48 is returned to an inoperative condition. The control circuit for the machine 20 then prepares this machine for producing the desired number of copies of the original by activating the copy producing portion of the machine and by clamping the 'eading edge of the master sheet 28 to the cylinder 52. Thus, the drive motor 66 is placed in an inoperative state along with the blower and motor assembly 88, and two additional drive motors 154 and 156 are placed in operation. The motor 156 is effective through a chain drive 158 to operate the magnetic brush developer 56. The drive motor 154 is effective through a chain drive 160, a gear train indicated generally as 162, and a chain drive 165 to rotate the cylinder or drum 52 and to drive the sheet feeding mechanism 38.

The cylinder or drum 52 includes a clamping means for detachably securing the leading edge of the master sheet 28 to the cylinder and for carrying the master sheet in sequence past the magnetic brush developer 56 and the transfer roller 58 so that a toner or material image is transferred to a copy sheet 34 during each cycle of revolution of the cylinder 52. This cylinder and the control means associated therewith include means for stripping the master sheet 28 from the cylinder 52 to the end of the copy run, and various other arrangements for insuring the production of proper copies by preventing the transfer of toner material to the copy sheet and the other feeding and guiding components of the apparatus 20.

Figures 5, 6, 7:
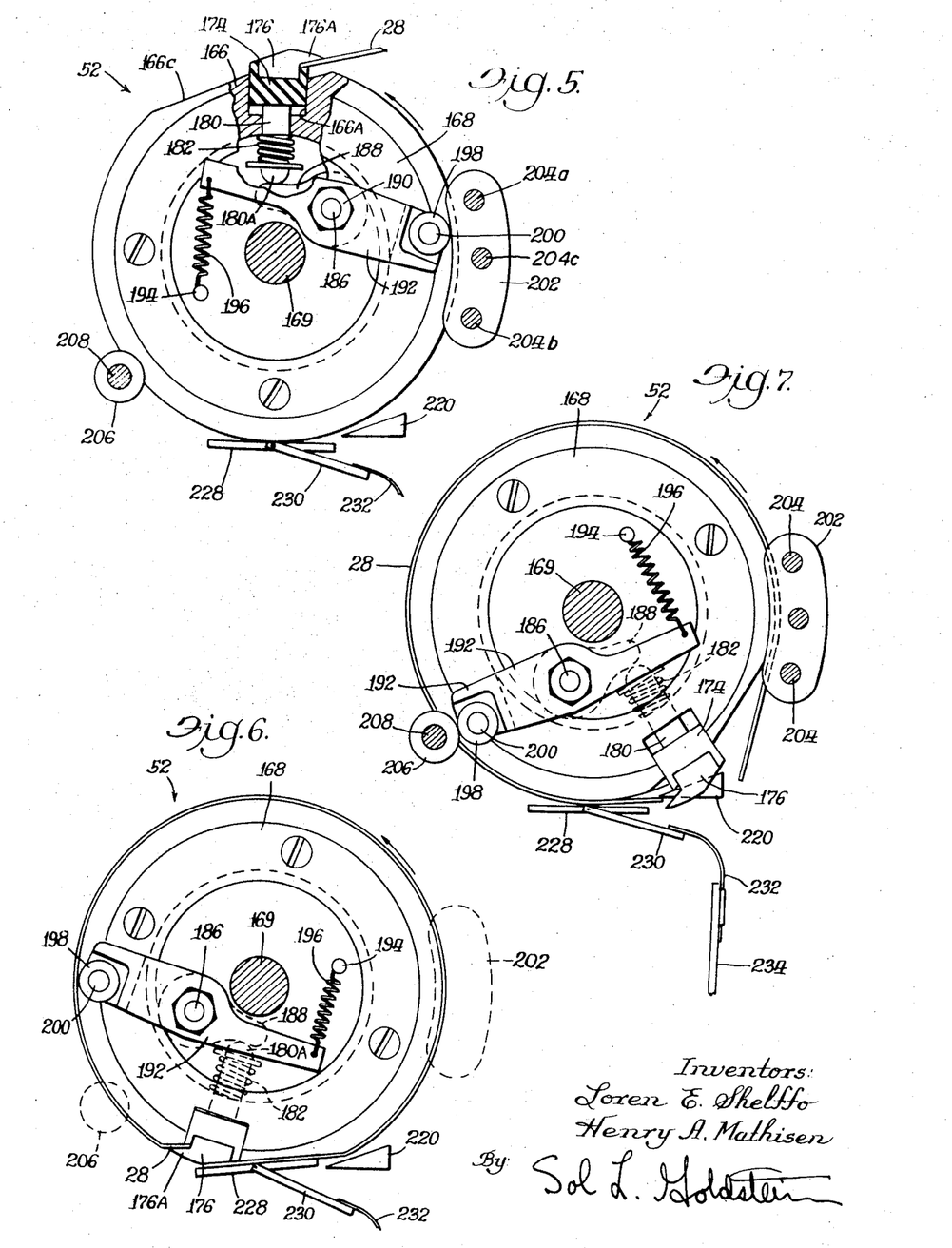
FIG. 5 is an end elevational view in partial section of a master sheet drum with a clamping means shown in an open or master sheet receiving position.
FIG. 6 is an elevational view similar to FIG. 5 showing the drum and clamping means during a cycle of rotation of the drum or cylinder.
FIG. 7 is an elevational view of the cylinder similar to FIG. 5, but illustrating the drum in a position in which the clamping means is opened to permit the removal and ejection of a master sheet.

The construction of the cylinder 52 is illustrated in FIGS. 5-9 and includes a hollow cylindrical body 166 to the opposite ends of which two end plates 167 (FIG. 9) and 168 are secured. A shaft 169 is rotatably mounted on spaced supports 170-172 (FIG. 9) and is secured to the end plates 167, 168. The shaft 169 is driven by the chain drive 164 to rotate the cylinder 52 in a counterclockwise direction (FIGS. 5-7).

To provide means for clamping the leading edge of the master sheet 28 to the cylinder 52, the cylindrical body 166 is provided with an axially extending groove or slot 166A along its outer periphery in which is received a generally rectangular block 174 of insulating material. The upper surface of the block 174 includes a longitudinally extending groove in which is located an electrically conductive clamp member 176 having an overhanging lip 176A spaced from the adjacent portion of the insulating block 174 to provide an opening into which the leading edge of the master sheet 28 can be inserted. The members 174 and 176 forming the clamp also include two slots 178 (FIGS. 8 and 9) formed therein to assist in stripping a master sheet 28 from the cylinder 52.

To provide means for shifting the clamping means between a clamping or effective position and a released or ineffective position, a plurality of pins 180 having enlarged head portions 180A are secured to the insulating block 174 at spaced positions along the length thereof (FIG. 8) and extend through openings 166B in the cylindrical member 166. A compression spring 182 is interposed between the adjacent inner wall of the cylindrical element 166 and a washer 184 bearing against the enlarged head portion 180A so as to normally bias the clamp to the clamping or effective position shown in FIG. 6. The shifting of the clamp between effective and ineffective positions is controlled by a shaft 186 which is pivotally mounted on the end plate 167 at one end and is pivotally mounted on and extends through the end plate 168 at the other end. A plurality of cams 188 are secured to the shaft 186 at spaced positions along the length thereof so that the cams underlie the rounded head portions 180A and are interposed between the shaft 169 and the enlarged head portions 180A. The end of the shaft 186 extending through the end plate 168 is secured, as by a nut 190, to a cam follower lever 192 so that the shaft 186 pivotally mounts the cam follower lever 192 on the end plate 168. A pin 194 secured to the end plate 168 is connected to one end of a tension spring 196, the other end of which is connected to one end of the cam follower lever 192 so as to continuously bias the lever 192 for pivotal movement in a counterclockwise direction about the axis of the shaft 186. A cam follower roller 198 is pivotally mounted in a recessed portion at the other end of the lever 192 by a shouldered machine screw 200 (FIG. 8).

To control the pivotal movement of the shaft 186, an elongated open cam 202 carried on a plurality of supporting rods or shafts 204 is movable into and out of an effective position adjacent one portion of the path of rotation of the cylinder 52 to provide means for opening the clamping means when the cylinder is in its normal position at the start of a copying cycle so as to permit the leading edge of the master sheet 28 to be received. An eject cam 206 carried on a shaft or rod 208 is movable into and out of an effective position adjacent the path of rotation of the cylinder 52 to provide a means for releasing the clamping means when the master 28 is to be stripped from the cylinder 52.

To provide means for movably supporting the open can 202 adjacent the path of rotation of the cylinder 52 or, more specifically, the cam follower lever 192, the two outermost rods 204 are slidably received in a pair of bushings 210 (FIG. 9) carried on the support 172, and the center rod or shaft 204 extends through an opening in the support 172 and is connected to a solenoid 212. A compression spring 214 interposed between the cam 202 and the support 172 normally biases the cam 202 to the effective position shown in FIGS. 5 and 7 in which it is disposed in the path of movement of the cam follower roller 198. When the solenoid 212 is energized, the center rod or shaft 204 is retracted by the solenoid 212 to shift the cam 202 to the right and out of the plane of movement of the cam follower 198 as indicated by dashed outline in FIG. 6.

Similarly, the eject cam 206 is movably mounted for movement into and out of the plane of movement of the cam follower roller 198 by slidably mounting the rod or shaft 208 in a bushing 214 (FIG. 9) carried on the support 172. A compression spring 216 interposed between the bushing 214 and the cam 206 normally biases the cam 206 into the plane of movement of the cam follower roller 198. The outer end of the rod or shaft 208 is connected to a solenoid 218 so that when the solenoid 218 is energized, the cam 206 is moved out of the plane of movement of the cam follower roller 198, as indicated in dashed outline in FIG. 6 of the drawings.

When the copier-duplicator machine 20 is placed in operation, the solenoids 212 and 218 are released so that the cams 202 and 206 are in the position shown in FIG. 5 and the cylinder assembly 52 is also located in this position awaiting the receipt of a master sheet 28 from the discharge 152 of the assembly 48. As the cylinder 52 rotated to the position shown in FIG. 5 at the conclusion of the preceding copying operation, the follower 198 engaged the cam 202 to pivot the cam follower arm 192 and the connected shaft 186 in a clockwise direction against the force of the tension spring 176. This pivots the plurality of cams 188 in a clockwise direction about the axis of the shaft 186 so that they move to the position shown in FIG. 5 to bear against the enlarged heads 180A, thus moving the elements 180 and the connected members 174 and 176 of the clamping means upwardly to provide a space between the lip 176A and the recessed surface of the cylinder 166 for receiving the leading edge of the master sheet 28.

When the control circuit starts counterclockwise rotation of the cylinder assembly 52, the cam follower 198 moves beyond the cam 202 and the tension spring 196 pivots the cam follower lever 192 and the connected shaft 186 and cams 188 in a counterclockwise direction so that the lower edges of the cams 188 bear against the shaft 169. As the cams 188 move to this position, the compression springs 182 move the members 180 downwardly to the position shown in FIG. 6 so that the lip 176A clamps the leading edge of the master sheet 28 against the outer surface of the cylindrical element 166 (see FIG. 6). Continuing rotation of the cylinder assembly 52 wraps the master sheet 28 around the outer surface of the cylindrical element 166 and permits the production of copies. During this first cycle of operation, the control circuit energizes the solenoids 212 and 218 so that the cams 202 and 206 are retracted, as indicated in dashed outline in FIG. 6, and the clamping means remains resiliently biased by the compression springs 182 to its effective position clamping the leading edge of the master sheet 28 to the cylinder assembly 52.

During the last cycle of revolution of the cylinder assembly 52 incident to any given copy order, the solenoids 212 and 218 are released to initiate the stripping of the master sheet 28 from the cylinder assembly 52 (see FIG. 7). As the follower roller 198 approaches the cam 206 and engages the surface thereof, the cam follower lever 192 is pivoted in a clockwise direction along with the connected shaft 186 and cams 188. The cams 188 bear against the enlarged heads 180A to compress the springs 182 and move the clamping means outwardly relative to the axis of rotation of the shaft 169. The cam 206 is so positioned that this occurs at the moment that the clamping means is approaching two spaced stripping blades 220 which are aligned with the slots 178 in the members 174 and 176. The blades 220 normally clear the clamping means except when the clamping means is in its outermost or released position. Thus, when the blades 220 enter the slots 178, they pass beneath the inner surface of the master sheet 28 (see FIG. 7) and divert the leading edge of the master sheet 28 for movement toward the station 60 (see FIG. 2).

As the follower roller 198 passes beyond the cam 206, the clamping means is again momentarily closed until such time as the cam follower 198 reaches the leading edge of the cam 202. Engagement of the follower roller 198 with the cam 202 opens the clamping means in the manner described above, and the cylinder assembly 52 moves to the normal position shown in FIG. 5 under the control of a cylinder positioning control.

Figure 9:
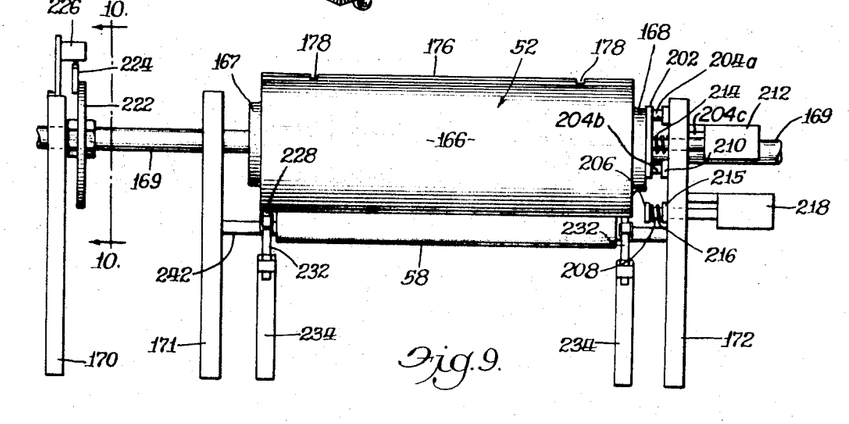
FIG. 9 is a reduced side elevational view illustrating the cylinder and controls therefor.
Figure 10:
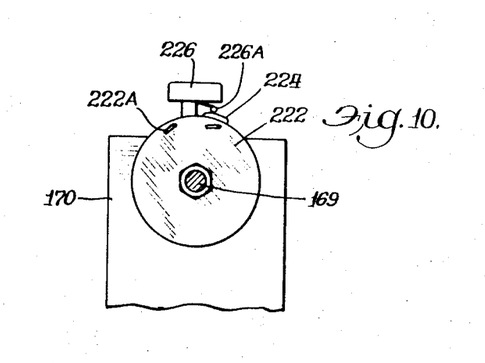
FIG. 10 is an enlarged fragmentary sectional view taken along line 10—10 in FIG. 9 illustrating a position control for the cylinder.

The cylinder positioning the control is illustrated in FIGS. 9 and 10 of the drawings and includes a generally circular plate 222 which is secured to the shaft 169 adjacent the support 170. The circular plate 222 carries a cam member 224 which is adjustably positioned on the plate 222 by means of a pair of elongates slots 222A in the plate and cooperating fasteners carried on the cam 224. A control switch 226 having an actuating arm 226A is secured in a fixed position on the support 170. The cam 224 is so located relative to the circular plate 222 that when the cylinder assembly 52 reaches its proper home position, the cam 224 operates the switch 226 to provide a signal to the control circuit indicating that the cylinder assembly 52 is in its normal or home position.

Since only the leading edge of the master sheet 28 is clamped against the outer surface of the cylinder assembly 52, there is a possibility that toner will be collected on the loose or trailing edge of the master sheet 28 as the cylinder assembly 52 rotates past the magnetic brush developer 56 even though this portion of the master sheet 28 has been discharged in the assembly 48 in the manner described above. Accordingly, it is desirable to avoid transferring this toner material to either the copy sheet 34 or to the pressure roller 58. The cylinder assembly 52 includes structure for preventing this transfer by insuring that the trailing portion of the master sheet 28 does not come into pressurized contact with either a copy sheet 34 or the transfer roller 58. More specifically, this structure includes a generally flat surface 166C (FIG. 5) which is disposed adjacent the clamping means on the cylinder assembly 52 and is so located that the trailing edge of the master sheet 28 normally overlies this surface or the adjacent flattened surface on the clamping means (see FIG. 6).

Two follower plates 228 are pivotally mounted on two brackets or supports 230 (FIGS. 5–7 and 9) which in turn are connected by two flat springs 232 to two upright supports 234 carried on the housing of the machine 20. The two supports 234 are disposed adjacent the ends of the cylindrical element 166 spaced beyond the ends of the transfer roller 58 (see FIG. 9). As illustrated in FIG. 6 of the drawings, the flat follower plates 228 engage opposite edges of the free trailing end of the master sheet 28 and resiliently bias it against the flat surface 166C so that this portion of the sheet is biased upwardly away from contact with the transfer roller 58. Thus, the transfer roller 58 cannot be soiled or contaminated with toner particles transferred from the trailing end of the master sheet 28. The following plates 228 also aid in holding the edge portion of the master sheet 28 against the rounded outer surface of the cylindrical element 166 during normal image transferring operations.

The magnetic brush developer 56 can be of any of the constructions well known in the art and can include a hollow roller or cylinder 236 (FIG. 2) containing a permanent magnet 238 and disposed within a trough 240 containing a toner or developing mix consisting of a blend of magnetic carrier particles and toner particles. One such developing mix is described in detail in the copending application of Loren E. Shelffo, Ser. No. 596,476, filed Sept. 23, 1966 and assigned to the same assignee as the present application. A direct current power supply coupled to the roller electrically biases the brush-like mass into which the developing mix is formed by the permanent magnet 238 to prevent toner particles from being deposited on the discharged or background areas of the master sheet. This biasing technique is described, for example, in U.S. Pat. No. 2,956,874.

This use of direct current bias in the magnetic brush developer assembly 56 poses problems because of the electrically conductive nature of the cylindrical element 166 and the clamping means, because any contact with the bristle-like mass of the magnetic brush and the electrically conductive shell 166 which is connected to ground or reference potential through, for instance, the shaft 169, would short the biasing supply. This problem is not presented with respect to the outer peripheral surface of the cylindrical element 166 inasmuch as this surface is covered by the master sheet 28 which has sufficient resistivity to prevent the establishment of a low impedance path. However and as illustrated in FIG. 6, the trailing edge of the sheet is spaced from the leading edge of the master sheet 28, and the electrically conductive clamping element 176 could short the magnetic brush biasing supply. To prevent this and as illustrated in section in FIG. 5 of the drawings, the electrically conductive clamping element 176 is carried in the insulating member 174 so that the clamping element is electrically insulated from the remainder of the cylinder assembly 52. In this manner, the cylinder assembly 52 does not present a low impedance path to the biasing potential used in the magnetic brush assembly 56.

As indicated above, the toner material selectively deposited on the electrostatic image carried on the master sheet 28 by the assembly 56 is transferred to a copy sheet 34 by the transfer roller 58. The transfer roller 58 comprises a metal core or shaft 242 (FIGS. 2 and 9) surrounded by a semiconductive rubber shell 244 having a resistivity in the range of from $10^4$ to $10^8$ ohm-cm. The pressure between the duplicating cylinder 166 and the transfer roll 58 is maintained in the range between 2 and 8 pounds per square inch, and a bias in the range from 1,200 to 3,500 volts is applied between electrically conductive and grounded cylinder 166 and the core or shaft 242. The operation of the transfer roll assembly 58 is described in more detail in the copending application of Loren E. Shelffo, Ser. No. 632,819, filed Apr. 21, 1967. In general, by the application of the bias and the pressure, the material image carried on the master sheet 28 is offset onto the copy sheet 34, and the latent electrostatic image on the master sheet 28 remains unaffected and can be re-developed during subsequent cycles of revolution of the cylinder assembly 52.

Figure 11:
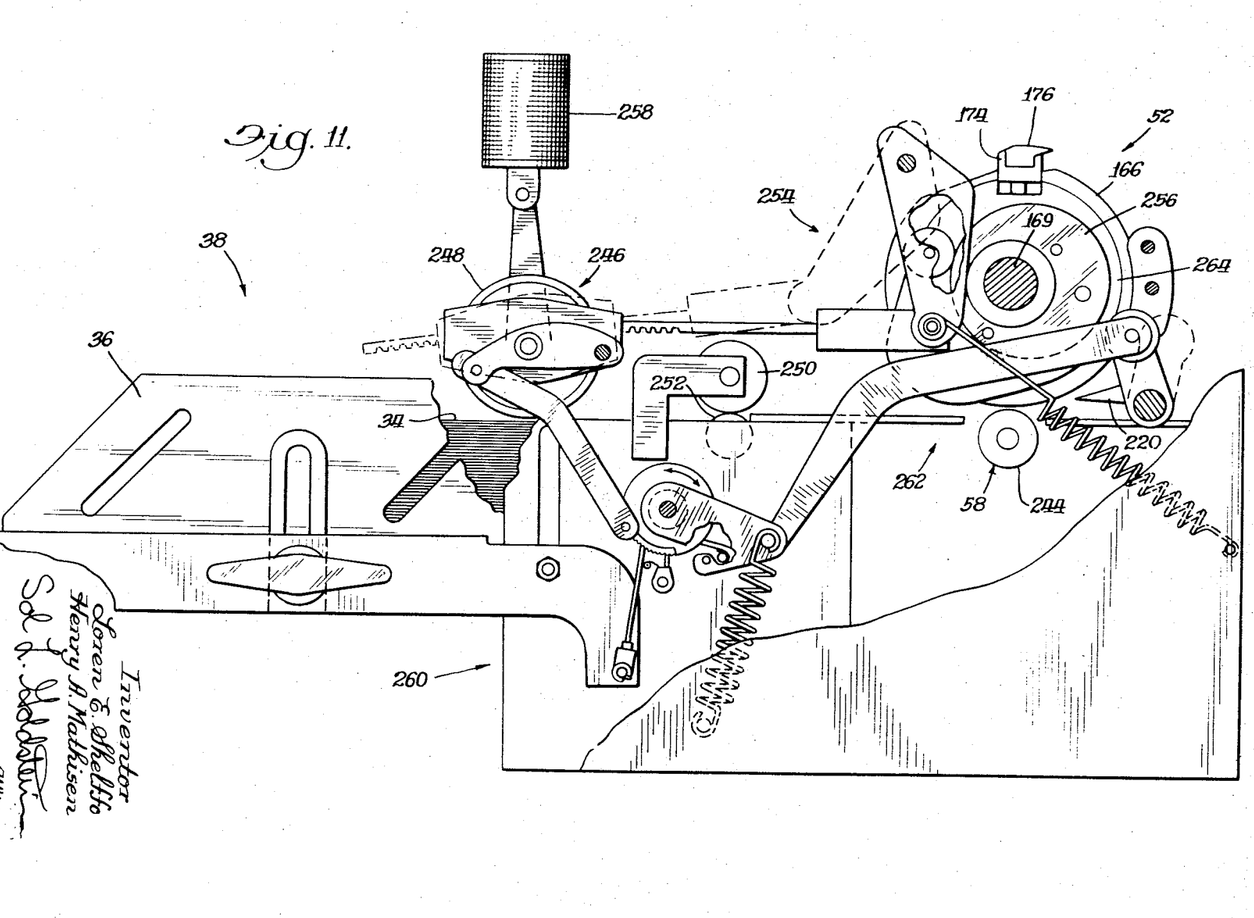
FIG. 11 is an enlarged side elevational view in partial section of a sheet feeding assembly for feeding copy sheets to the cylinder.

The sheet feeding assembly 38 (FIG. 11) is of a conventional and well-known construction used, for example, by Addressograph-Multigraph Corporation, and one such unit is shown and described in detail in U.S. Pat. No. 3,294,019. In general, the assembly 38 includes the magazine or supporting structure 36 for the stack of copy sheets 34 and an assembly indicated generally as 246 for driving a rubber-tired wheel 248 to feed the top sheet 34 from the stack between a pair of rollers 250 and 252 to the nip between the transfer roller 58 and the cylinder 52. The assembly 246 is driven by a cam and follower assembly indicated generally as 254 and including a cam 256 secured to the main shaft 169 carrying the cylinder assembly 52. The energization of a solenoid 258 lifts the assembly 246 including the wheel 248 to render the wheel 248 ineffective to feed sheets 34 from the stack and to permit the stack to be replenished. An elevator mechanism indicated generally as 260 raises the magazine 36 to maintain the uppermost sheet 34 in the stack in a proper feed position in engagement with the wheel 248. The elevator mechanism 260 is driven by a linkage 262 actuated by a cam 264 which is also carried on and driven by the shaft 169.

As set forth above, the assembly 38 feeds a copysheet 34 to the nip between the transfer roller 58 and the duplicating cylinder assembly 52 once during each cycle of revolution of the cylinder 52 so that the material image provided by the magnetic brush developer 56 is transferred to the copy sheet. The copy sheet is fed over a supporting table 266 (FIG. 2) to the nip between a pair of pressure rollers 268 and 270 which fix or place in permanent form the material image transferred to the copy sheet 34. The roller 270 is driven by the gear train means 162 from the motor 154, and a resiliently biased and pivotally mounted wiper 272 engages the roller 268 to remove any toner or deve'oping material transferred to this roller from the copy sheet 34.

As the copy sheet passes beyond the fixing station 60, it is received on a flexible conveying belt 274 which passes around a pair of spaced rollers 276 and 278. The rollers 278 are driven through a chain drive 280 from the motor 154. A combined blower-motor assembly 282 which is energized when the machine 20 is placed in operation discharges air against the flexible belt 274 to hold the copy sheet 34 thereon until it is discharged through the opening 64 onto the copy receiving rack or tray 62.

A control circuit 300 (FIG. 12) controls and synchronizes the operation of the various components of the copier-duplicator machine 20. The control circuit 300 and the other components of the machine 20 are energized from a conventional alternating current potential source through a detachable male connector or plug 301. When the machine 20 is to be placed in operation, a main switch 302 is closed to energize the circuit 300. The energization of the circuit 300 energizes a lamp 303 to provide a visible indication that the machine 20 is energized.

Figure 12:
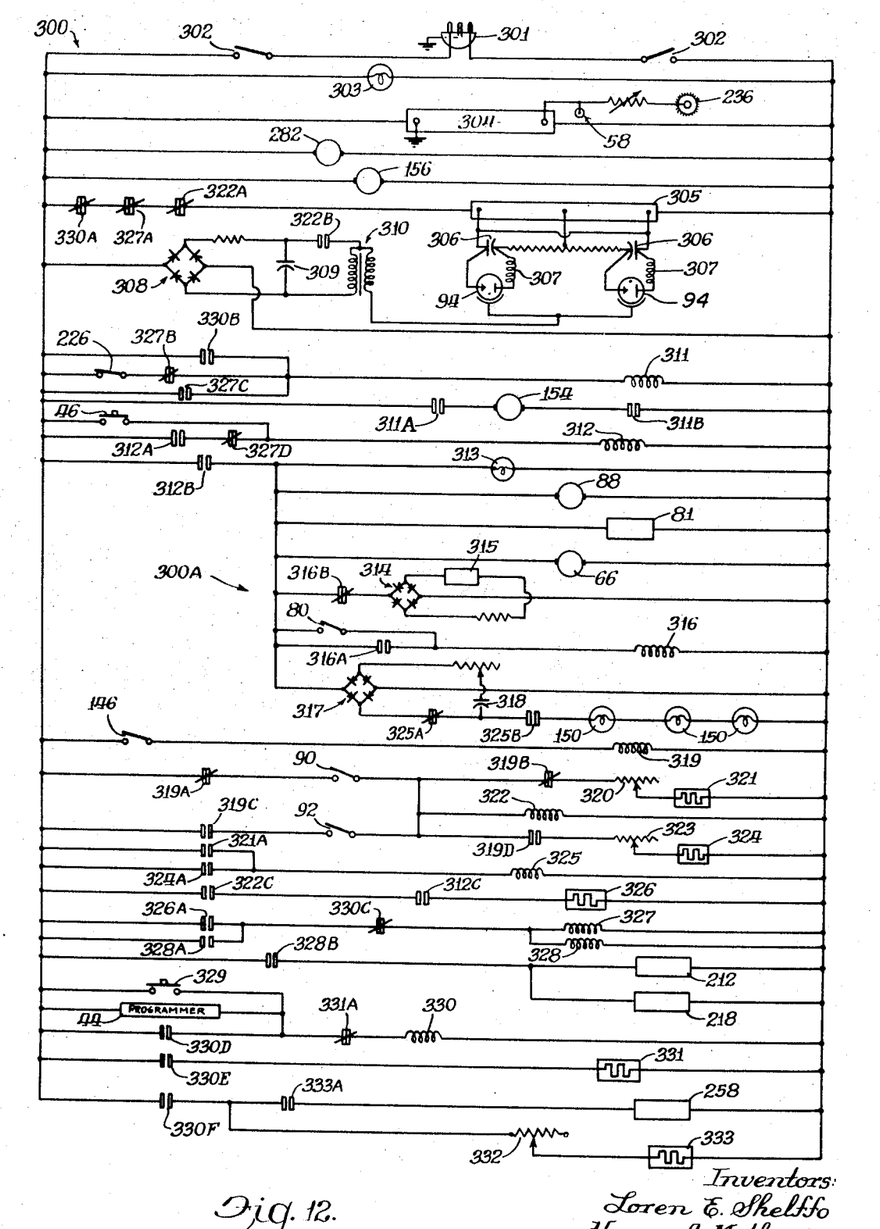
FIG. 12 is a schematic circuit diagram of a control system included in the copier-duplicator.

The closing of the main switch also energizes a direct current power supply 304 so that a direct current bias potential is supplied to the transfer roller 58 and to the cylinder 236 in the magnetic brush developer assembly 56. The closure of the main switch 302 also energizes the drive motor in the assembly 282 so that air is discharged onto the belt 274 to aid in conveying the copy sheet 34. The motor 156 is also energized at this time to start rotation of the cylinder 236 in the magnetic brush developer 56. A power supply circuit 305 is also energized over a circuit including three pairs of normally closed contacts 330A, 327A, and 322A to provide a source of direct current potential for energizing the lamps 94 which illuminate the original on the glass panel 24. The lamps 94 are not energized at this time inasmuch as a triggering potential is not applied to the trigger or auxiliary electrodes thereof. The power supply 305 charges a pair of capacitors 306 which are connected across the main electrodes of the tubes 94, each in series with a choke 307. The closure of the main switch also energizes a fullwave rectifier bridge 308 so that a capacitor 309 is charged.

If the cylinder assembly 52 is not in a normal position, the cam 224 (FIG. 10) permits the switch 226 to remain in a nonoperated condition so that the switch 226 (FIG. 12) is closed. This completes a circuit extending through a pair of normally closed contacts 327B for operating a relay 311 to close two pairs of normally open contacts 311A and 311B. The closure of the contacts 311A and 311B energizes the main drive motor 154 so that the cylinder assembly 52 is rotated through the chain drives 160 and 164 and the gear train 162 to move the cylinder assembly 52 toward its normal position. When the cylinder assembly 52 reaches its normal position, the cam 224 (FIG. 10) actuates the switch 226 and opens the switch 226 (FIG. 12) so that the relay 311 is released to open the contacts 311A and 311B and thus stop the main drive motor 154 with the cylinder assembly 52 in its normal position. The control circuit 300 is now in condition to initiate a cycle of operation.

With the original positioned on the glass pane 24, the machine operator now momentarily depresses the start switch 46 (FIGS. 1 and 12) so that an obvious operating circuit for a relay 312 is completed. In operating, the relay 312 closes three pairs of normally open contacts 312A, 312B, and 312C. The closure of the contacts 312A completes a holding circuit for the relay 312 extending through a pair of normally closed contacts 327D. The closure of the contacts 312C prepares an operating circuit for a time delay relay 326. The closure of the contacts 312B energizes a secondary control circuit 300A included in the control circuit 300, which secondary control circuit controls the operation of the master sheet preparing assembly 48.

More specifically, the closure of the contacts 312B energizes a lamp 313 to provide a visible indication that the master preparing assembly 48 is in operation. The closure of the contacts 312B also energizes the vacuum motor 88 so that an inflow of air through the perforated belts 82 into the vacuum chest 84 is produced to prepare this assembly for holding the master sheet 28 at the exposure station 50. The sub-circuit 300A also energizes the corona charging units 81 and initiates operation of the drive motor 66 so that the four pairs of master sheet feed rollers 72-75 are placed in rotation, the perforated conveying belt 82 being rotated by the roller 74. The closure of the contacts 312B also energizes a fullwave rectifier bridge 317 so that a capacitor 318 is charged over a circuit including a pair of normally closed contacts 325A.

The energization of the secondary control circuit 300A also energizes a fullwave rectifier bridge 314 through a pair of normally closed contacts 316B to energize a clutch 315. The clutch 315 controls the coupling between the feed wheel 76 and the driven roller 72 so that the uppermost master sheet 28 resting on the support 30 is fed into the nip between the rollers 72 and is advanced into the curved guideway 78. As the leading edge of the master sheet 28 enters the guideway 78, it actuates the switch 80 (FIGS. 2 and 12) so that an operating circuit for a relay 316 is completed to operate this relay.

The operation of the relay 316 closes a pair of normally open contacts 316A to complete a holding circuit for the relay 316 and opens the closed contacts 316B. The opening of the contacts 316B terminates the energization of the bridge 314 and thus terminates the energization of the clutch 315 so that the wheel 76 is no longer driven. Thus, the master sheet 28 is now advanced solely under the control of the spaced sets of driven rollers 72-75. When the trailing edge of the master sheet 28 clears the switch 80, this switch is released to its open condition, but the relay 316 is maintained operated over the holding circuit afforded by the closed contacts 316A.

The master sheet 28 is now advanced through the corona charging units 81 so that a uniform electrostatic charge is applied to both surfaces of the master sheet, and the leading edge of this sheet then passes between the uppermost roller 74 and the flexible belt 82 to be conveyed over the vacuum chest 84. The vacuum chest 84 holds the master sheet in a single plane at the exposing station 50. When the full extent of the charged photoconductive surface of the master sheet 28 is disposed in the exposing station 50, the switches 90 and 92 are actuated by the leading edge of the master sheet 28 to effect the exposure of the master sheet in accordance with the original disposed on the glass panel 24.

The next operations of the control circuit 300 are dependent on whether full size or reduced size copies of the original are to be made. If full size copies are to be made, the control circuit 300 is in the state illustrated in FIG. 12, and the closure of the switch 90 completes a circuit for energizing a time delay relay 321 extending through a pair of normally closed contacts 319B and a variable resistance element 320 which can be adjusted to vary the time delay of the relay 321. The closure of the switch or contacts 90 also energizes and operates a relay 322. Alternatively, if a reduced size copy is to be produced, the prior movement of the handle assembly 132 and the connected arm 42 (FIG. 1) from the position illustrated therein to one in which the element 136 enters the opening 144 (FIG. 4) operates the switch 146. The operation of the switch 146 (FIG. 12) energizes and operates a relay 319 to close a plurality of normally open contacts 319C and 319D and to open the contacts 319A and 319B. The opening of the contacts 319A disables control of the circuit 300 by the switch 90, while the opening of the contacts 319B prevents the completion of the operating circuit for the time delay relay 321. The closure of the contacts 319C renders the switch 92 effective to control the circuit 300, while the closure of the contacts 319D prepares a circuit which is completed by the operation of the switch 92 for energizing a time delay relay 324 over a circuit including an adjustable resistance element 323 which adjusts the time delay of the relay 324. Thus, with the relay 319 operated to indicate that the reduced size copies are to be made, the switch 90 is disabled and the switch 92 is enabled so that its closure completes an operating circuit for the relay 322 and the second time delay relay 324 rather than the relays 322 and 321 which are energized by the switch 90. Accordingly, when either of the switches 90 or 92 is operated, the relay 322 is operated, and only one of the time delay relays 321 and 324 is energized in dependence on the one of the two switches 90 or 92 rendered effective by the operated or released state of the relay 319.

Whenever either of the switches 90 or 92 is closed, the relay 322 is operated to open the closed contacts 322A and to close two pairs of normally open contacts 322B and 322C. The opening of the contacts 322A terminates the energization of the power supply 305, the capacitors 306 being fully charged at this time. The closure of the contacts 322B discharges the capacitor 309 through one winding of a pulse forming transformer 310 so that a high potential pulse is applied to the starter or trigger electrodes of the two lamps 94. The application of the starter pulse to the two trigger electrodes ionizes the gas-filled tubes 94 so that the two capacitors 306 discharged therethrough through the chokes 307 to produce a flash of intense light which is reflected off the original on the glass pane 24 and transmitted over the optical assembly 40 to selectively illuminate the uniformly charged surface of the master sheet 28 now moving through the exposing station 50. The chokes 307 control the discharge time of the capacitors 306 and thus the duration of the flash. It has been determined that with a master sheet 28 moving at a speed of 3 inches per second, a resolution of five lines per millimeter is achieved with a flash duration on the order of 400 microseconds.

The use of two switches 90 and 92 to control the energization of the relay 322 and thus the flashing of the lamps 94 permits these two switches to be disposed in spaced positions relative to the path of movement of the master sheet 28 and thus permits the electrostatic image developed on the master sheet 28 to be properly positioned with respect to its leading and trailing edges. However, if this is not desired, the control circuit 300 could be designed for use with a single one of the switches 90 or 92 connected directly to the input line, and the contacts 319A and 319C as well as their functions could be discarded.

The closure of the contacts 322C when the relay 322 is operated completes a circuit for energizing a time delay relay 326, this circuit including the previously closed contacts 312C. The time delay relay 326 does not operate at this time.

As set forth above, an operating circuit for one or the other of the two time delay relays 321 and 324 is completed by the closure of one of the switches 90 or 92 in dependence on the state of the relay 319 or the prior selection of full size or reduced size copies. The time delay relay 321 is energized when full size copies are to be made, and the time delay relay 324 is energized when reduced size copies are to be made. The two time delay relays 321 and 324 each have time delays shorter than the relay 326 to perform the control function of removing the undesired charge at the trailing end of the master sheet 28 by controlling the selective energization of the lamps 150. Since the relay 321 is used with full size copies and since a shorter length of the trailing edge of the master 28 contains undesired charge when full size copies are made, the relay 321 is set to have a longer time delay period than the relay 324 which is used with reduced size copies. This is true because, with reduced size copies, a greater length of the trailing edge is not occupied by the electrostatic image and requires discharging. Thus, with the master sheet 28 moving through the exposing station 50 following its exposure, a shorter time after reduced size exposure is required to move all of the image bearing areas through the rollers 75 to a position in which the image is protected from and only the non-image bearing area is exposed to the illumination provided by the lamps 150.

Accordingly, at the end of the time delay period of the relay 321 or the relay 324, one of two pairs of contacts controlled by these two relays 321A or 324A is closed to complete an energizing circuit for the relay 325. The operation of the relay 325 opens the contacts 325A and closes a pair of normally open contacts 325B. The opening of the contacts 325A terminates the charging of the capacitor 318 by the bridge 317, and the closure of the contacts 325B connects the charged capacitor 318 in series with the lamps 150 so that the capacitor 318 discharges through the series connected lamps 150 to provide momentary illumination thereof. The energization or illumination of the lamps 150 uniformly illuminates the portion of the master sheet 28 that has not moved out of the exposing station to the light protected position afforded at the outlet rollers 75. This uniform illumination removes the electrostatic charge on the exposed portion of the trailing end of the master sheet 28.

The rollers 75 and the conveying belt 82 move the master sheet 28 containing the electrostatic image outwardly from the master forming assembly 48 through the discharge opening 152 to a position in which the leading edge of the exposed master sheet approaches the cylinder assembly 52 and is inserted between the outer surface of the element 166 and the lip 176A of the clamp 176. As this happens, the time delay relay 326 times out to close a pair of normally open contacts 326A. The closure of the contacts 326A completes an operating circuit for a pair of relays 327 and 328 to operate these relays.

The operation of the relay 327 opens the contacts 327A, 327B, and 327D and closes a pair of normally open contacts 327C. The opening of the contacts 327A interrupts an additional point in the circuit for energizing the power supply 305 for the lamps 94 and thus prevents any possible re-energization of these lamps. The opening of the contacts 327B interrupts a point in the circuit described above controlled by the cylinder assembly positioning switch 326 to prevent operation of the relay 311 under the control of this positioning switch. The closure of the contacts 327C operates the relay 311 to close the contacts 311A and 311B and thus energizes the main drive motor 154 so that counterclockwise rotation of the cylinder assembly 52 (FIG. 2) occurs. As set forth above, this rotation of the drum 52 clamps the leading edge of the exposed master sheet 28 and starts to wrap the master sheet 28 about the outer surface of the cylindrical element 166.

The opening of the contacts 327D when the relay 327 is operated interrupts the holding circuit for the relay 312 so that this relay releases to open the contacts 312A, 312B, and 312C. The opening of the contacts 312A interrupts an additional point in the holding circuit for the relay 312. The opening of the contacts 312B terminates the energization of the secondary control circuit 300A so that this circuit returns to a normal condition and, in doing so, releases the relay 316. The opening of the contacts 312C interrupts the energizing circuit for the time delay relay 326 so that this relay releases to open the contacts 326A.

The opening of the contacts 326A interrupts the above-described energizing circuit for the relays 327 and 328. However, the operation of the relay 328 concurrent with the operation of the relay 327 closes two pairs of normally open contacts 328A and 328B. The closure of the contacts 328A completes a holding circuit for the relays 327 and 328 to prevent their release when the time delay relay 326 is released. The closure of the contacts 328B energizes the solenoids 212 and 218 so that the open cam 202 and the eject cam 206 are retracted to prevent opening of the clamping means in the cylinder assembly 52.

As the trailing edge of the master sheet 28 passes beyond the switches 90 and 92, these switches are both released to release the operated one of the time delay relays 321 or 324 and to release the relay 322. The release of the operated one of the time delay relays 321 or 324 and the opening of the contacts 321A or 324A releases the relay 325. This returns the contacts 325A and 325B to their normal state to prepare the circuit for charging the capacitor 318 in the secondary control circuit 300A. The release of the relay 322 interrupts an additional point in the operating circuit for the time delay relay 326 by opening the contacts 322C and restores a portion of the energizing circuit for the power supply circuit 305 by closing the contacts 322A, this circuit being interrupted at the open contacts 327A.

During the first cycle of revolution of the cylinder assembly 52, the electrostatic image carried on the master sheet 28 on the cylinder assembly 52 is first developed at the magnetic brush developer station 56 to provide a material image, and this material image is transferred by the transfer roller assembly 58 to a copy sheet 34 fed by the assembly 38. This copy sheet is then advanced through the station 60 at which the material image is fixed or placed in permanent form, and the copy bearing sheet 34 is carried by the conveying belt 274 to be discharged into the copy rack 62. Continuing rotation of the cylinder assembly 52 advances the copy sheet past the magnetic brush developer 56 to produce another material image which is subsequently transferred by the transfer roll assembly 58 to the next copy sheet 34 fed by the assembly 38. This operation continues until all of the copies desired have been produced.

More specifically, the programmer unit 44 which can be of the type shown and described in detail in the copending application of Lester Rabb et al., Ser. No. 683,713, filed Nov. 16, 1967, which application is assigned to the same assignee as the present invention, is actuated in response to each cycle of rotation of the cylinder assembly 52 to count the number of copies produced by the machine 20. When the desired number of copies has been reached, the programmer 44 completes an energizing circuit for a relay 330 over a circuit including a pair of normally closed contacts 331A. The operation of the relay 330 opens the normally closed contacts 330A and 330C and closes a plurality of normally open contacts 330B, 330D, 330E, and 330F. The closure of the contacts 330D completes a holding circuit for the relay 330 extending through the closed contacts 331A. The opening of the contacts 330A interrupts an additional point in the energizing circuit for the power supply 305 for the lamps 94. The closure of the contacts 330B completes a holding circuit for the relay 311 to maintain this relay operated and the main drive motor 154 in operation. The closure of the contacts 330F prepares a portion of an operating circuit for the solenoid 258 as well as completing an energizing circuit for a time delay relay 333 extending through a variable resistance element 332 which is used to adjust the time delay interval of the relay 333. The closure of the contacts 330E energizes a time delay relay 331.

The opening of the contacts 330C interrupts the holding circuit for the relays 327 and 328 so that these relays release to start the restoration of the control circuit 300 to its normal condition. The closure of the contacts 327A does not re-energize the power supply 305 for the lamps 94 because of the prior opening of the contacts 330A. The opening of the contacts 327C does not release the relay 311 because of the prior closure of the contacts 330B. The closure of the contacts 327B prepares the circuit controlled by the position switch 226. The closure of the contacts 327D prepares a point in the holding circuit for the relay 312. The opening of the contacts 328A interrupts an additional point in the holding circuit for the relays 327 and 328, and the opening of the contacts 328B terminates the energization of the solenoids 212 and 218 so that these solenoids are released. When these two solenoids are released, the compression springs 214 and 216 (FIG. 9) restore the open cam 202 and the eject cam 208 to their effective positions as illustrated in FIG. 7 of the drawings.

During the cycle of rotation of the cylinder assembly 52 next following the one in which the last copy is produced, the cam 206 releases the clamping means 176 as shown in FIG. 7 so that the stripper blades 220 enter the slots 178 and deflect the leading edge of the master sheet 28 into the discharge path. During this cycle, the assembly 38 remains effective and feeds a copy sheet 34 which overlies the image bearing surface of the master sheet 28 not for the purpose of producing a copy, but for the purpose of covering the toner bearing surface of the master sheet 28 to prevent contamination of the transfer roller assembly 58 or the roller 270. During this cycle of operation, the time delay relay 333 times out to close a pair of normally open contacts 333A. The closure of the contacts 333A energizes the solenoid 258 to lift the copy sheet feeding assembly 246 (FIG. 11) and thus prevent the feeding of an additional copy sheet 34.

At the end of this additional cycle of revolution of the cylinder assembly 52 in which the master 28 is stripped from the cylinder and fed out of the machine 20 by the conveying belt 274, the time delay relay 331 times out and opens the normally closed contacts 331A to interrupt the holding circuit for the relay 330 so that this relay releases to restore its contacts to their normal condition. The opening of the contacts 330B releases the relay 311 to open the contacts 311A and 311B. This is effective to terminate energization of the main drive motor 154 if the cylinder assembly 52 has been restored to its normal position with the clamping means 176 open. If, however, the cylinder assembly 52 is not in its normal position, the switch 226 is closed, the relay 311 remains operated, and the drive motor 154 is energized until it reaches its normal home position to open the switch 226 and thus release the relay 311 and terminate energization of the drive motor 154.

The opening of the contacts 330D when the relay 330 releases opens the holding circuit for this relay at a second point, and the opening of the contacts 330F releases the solenoid 258 to restore the sheet feeding assembly 38 to its normal condition, no sheets being fed because the drive motor 154 is no longer energized. The opening of the contacts 330F also releases the delay relay 333, and the opening of the contacts 330E releases the time delay relay 331. The remaining contact operations produced by the release of the relays 330, 331, and 333 aid in conditioning the control circuit 300 for an additional cycle of operation. The operations described above by which the master 28 is stripped from the cylinder assembly 52 under the control of the relay 330 can also be initiated by manually depressing a push button 329.

Although the present invention has been described with reference to a single illustrative embodiment thereof, it should be understood that numerous other modifications and embodiments can be devised by those skilled in the art that will fall within the spirit and scope of the principles of the present invention.

What is claimed and desired to be secured by Letters Patent of the United States is:

1. An apparatus for forming an electrostatic image of an original on a photoconductive member comprising
charging means for applying a uniform electrostatic charge to a surface of the member,
exposing means for selectively illuminating the charged surface of the member in accordance with the original to produce an electrostatic image of the original in a given area of the charged surface of the member, said exposing means including first lamp means,
drive means for moving the member along a path relative to the charging means and the exposing means,
switch means actuated by movement of the member to a given point along the path,
a first control circuit controlled by the switch means for energizing said first lamp means in the exposing means to produce the electrostatic image,
second lamp means for illuminating the charged surface of the member, and
second control means connected to the second lamp means and operated after the first control circuit for energizing the second lamp means to illuminate a part of the charged surface of the member.

2. The apparatus set forth in claim 1 including
adjustable means in the exposing system adjustable to different settings to produce electrostatic images of different sizes on the charged surface of the member, and
means in the second control circuit controlled in accordance with the different settings of the adjustable means for providing different time delay periods between the energization of the first and second lamp means.

3. The apparatus set forth in claim 1 including
drive control means included in the first control circuit and connected to the drive means for arresting operation of the drive means.

4. The apparatus set forth in claim 3 in which
the drive control means includes time delay means for delaying the operation of the drive control means to arrest operation of the drive means until after the energization of the first lamp means by the first control circuit.

5. In an apparatus for making a copy of an original using a photoconductive member,
drive means for moving the photoconductive member over a given path,
charging means disposed adjacent one portion of the path for applying a uniform charge to a surface of the member,
an optical system including an adjustable lens assembly and lamps for selectively illuminating the charged surface of the member in accordance with the original to provide a charge image,
manually operable means settable to different settings for adjusting the lens assembly to provide charge images of different sizes,
a plurality of switch means operated when the member is at different positions along said path, and
control means connected to the lamps and the plurality of switches and controlled by the setting to which the manually operable means is set for rendering one of the switch means effective to control the illumination of the lamps in accordance with the size of the charge image to be produced.

6. An apparatus for forming an electrostatic image on a photoconductive layer in accordance with an original comprising
charging means for applying a uniform charge to the layer,
exposing means at an exposure station for exposing a charged surface of the layer in accordance with the original,
sheet feeding means for moving the layer in a predetermined direction past the charging means and the exposing means,
said exposing means providing an electrostatic image on the charged surface in a manner to occupy only a leading portion of the surface in the direction of feed, and leaving a trailing portion in the direction of feed unexposed,
charge removing means for removing the charge from the charged surface of the layer,
and control means for controlling the charge removing means to operate the latter at a time appropriate to removal of the charge on the unexposed trailing portion of said surface as the trailing portion is fed past said charge removing means by said sheet feeding means and after the imaged leading portion has been fed out of range of the charge removing means.

7. An apparatus as set forth in claim 6 in which the control means is controlled in accordance with the size of the electrostatic image.

8. An apparatus as set forth in claim 6 in which the control means is controlled in accordance with the setting of selection means for selecting the size of the electrostatic image.

9. An apparatus as set forth in claim 8 in which the control means includes a switch means, operated in response to the copy sheet's attaining a predetermined position.

10. An apparatus as set forth in claim 9 in which the control means includes time delay means providing different time delay periods between actuation of the switch and operation of the charge removing means, and which further includes means to activate the time delay means to provide the appropriate delay, dependent upon the setting of the selection means which determines the size of the electrostatic image.

* * * * *